(12) United States Patent
Rosenberg (10) Patent No.: US 6,307,924 B1
(45) Date of Patent: Oct. 23, 2001

(54) METHOD OF CHARGING FOR SERVICES, NETWORK NODE, AND GATEWAY NODE

(75) Inventor: Marc Rosenberg, Renningen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/274,356

(22) Filed: Mar. 23, 1999

(30) Foreign Application Priority Data

Mar. 28, 1998 (DE) .............................. 198 13 906

(51) Int. Cl.$^7$ .................................. H04M 15/00
(52) U.S. Cl. .............. 379/115.01; 379/115.02; 379/115.03
(58) Field of Search ...................... 379/121, 129, 379/114, 115, 112, 220, 221, 130, 126, 125, 121.01, 121.04, 115.02, 115.01; 455/405, 406, 433, 445, 436

(56) References Cited

U.S. PATENT DOCUMENTS

| | | | |
|---|---|---|---|
| 5,991,375 | * | 11/1999 | Stahl et al. .......................... 379/113 |
| 6,038,439 | * | 3/2000 | Rune .................................. 455/406 |

FOREIGN PATENT DOCUMENTS

| | | |
|---|---|---|
| 195 22 988 A1 | 1/1997 | (DE) . |
| 195 24 405 C2 | 1/1997 | (DE) . |
| 195 47 194 A1 | 6/1997 | (DE) . |
| WO 95/22230 | 8/1995 | (WO) . |
| WO 98/11712 | 3/1998 | (WO) . |

* cited by examiner

*Primary Examiner*—Curtis Kuntz
*Assistant Examiner*—Rexford N Barnie
(74) *Attorney, Agent, or Firm*—Sughrue, Mion, Zinn, Macpeak & Seas, PLLC (57) ABSTRACT

The invention relates to a method of charging for services in a communications system consisting of two or more communications networks (KN1, KN2, KN3) of different network operators, and to network nodes (N3 to N5) and gateway nodes (GN1 to GN4) for such a communications network. For a connection whose establishment was initiated by a subscriber (A) of a first communications network (KN1) of the communications system, one or more services are provided by network nodes (N3 to N5) of a second communications network (KN2; KN3). Each of the network nodes (N3 to N5) of the second communications network (KN2) which provide services for the connection determines a charge (Waaa to Wccc) assigned to the service. Charges (Waaa to Wccc) to be made in the first communications network (KN1) are signaled by network nodes (N3 to N5) of the second communications network to a first gateway node (GN2) of the second communications network which is assigned to the connection in the direction of the first communications network (KN1). The first gateway node (GN2) signals the charges signaled to it (Weee) onward to the first communications network (KN1).

14 Claims, 5 Drawing Sheets

METHOD OF CHARGING FOR SERVICES, NETWORK NODE, AND GATEWAY NODE

BACKGROUND OF THE INVENTION

This invention relates to a method of charging for services, to a network node, and to gateway nodes.

The invention starts from a conventional method of charging for transmission services in telephone networks as is described, for example, in the "Lehrbuch der Fernmeldetechnik", Vol. 1, 5th Edition, 1986, Fachverlag Schiele & Schöbn GmbH, Berlin, pages 614 to 620.

The charging for a telephone call is controlled by the local exchange of the subscriber who initiated the call. Based on the called number, the time of day, and the day of the week, a tariff to be assigned to the call is determined. A metering pulse rate corresponding to this tariff is determined, and according to the metering pulse rate, metering pulses are sent from the local exchange over the subscriber line to the subscriber's terminal. Based on the received metering pulses, the subscriber's terminal then computes the charges currently accumulated for the call. Furthermore, the local exchange computes the call charge from the tariff determined and the call duration.

If part of the connection was set up through a telephone network of another network operator, as is the case with an international call, for example, the network operator who charges the call to the subscriber must pay a charge to the other network operator for using this section of the circuit. The balancing of accounts between the network operators takes place during postprocessing, i.e., the charge data are collected at the end of a month, for example, and evaluated by means of a computer.

This conventional charging method has the disadvantage that more flexible tariff models are difficult to implement, and that telecommunications services which are provided in telephone networks of other network operators and go beyond a pure transmission service cannot be billed together with the transmission service.

SUMMARY OF THE INVENTION

The invention has for its object to permit more flexible charging for connections or connection configurations which exist between terminals of different communications networks.

This object is attained by a method of charging for services, a network node, and gateway nodes.

The idea underlying the invention is to signal the charges for services provided in a communications network of another network operator from nodes of this communications network to a gateway node of the latter which then signals the received charge data onward to communications network of the subscriber who initiated the call.

"Services" as used herein means both transmission services and other telecommunications services, such as the provision of information or order services. The advantage of the invention is that charging for all services provided in communications networks of other network operators is made possible via the access network of the subscriber who initiated the call. The charge data are currently available in the access network of the subscriber. This permits extremely flexible charge indication and billing. The subscriber gets only one bill for the use of telecommunications networks, namely from the access-network operator.

Further advantageous aspects of the invention are defined in the subclaims.

It is particularly advantageous that gateway nodes to third communications networks in which services are also provided for the call signal the charges accumulated for the call in the third communications network and in further, subsequent communications networks to the gateway node of the second communications network, which carries out the onward signaling into the first communications network. The solution according to the invention thus represents a global, iterative solution in which the number and arrangement of the communications networks in which services are provided for a call are of no importance.

It is also advantageous to signal, besides "effective charges", which are made by the access-network operator, "dummy charges", which are paid via another contractual relationship. This makes it possible to provide a charge indication which is correct for all possible cases. Furthermore, greater flexibility is provided for the tariff structure, for example by taking into account such otherwise paid charges in giving discounts.

BRIEF DESCRIPTION OF THE DRAWINGS

The invention will become more apparent from the following description of several embodiments when taken in conjunction with the accompanying drawings, in which.

DETAILED DESCRIPTION OF THE INVENTION

Figure 1:
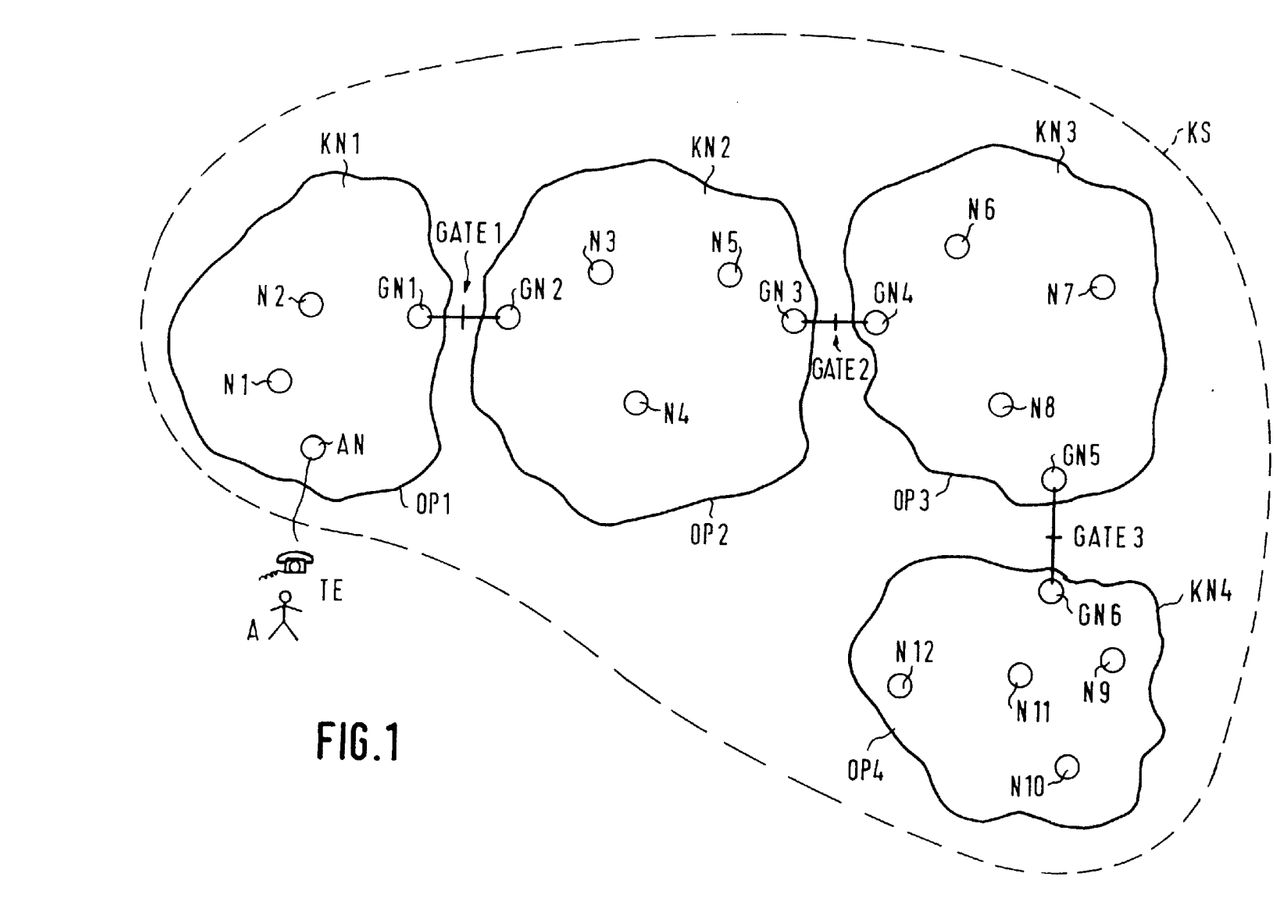
FIG. 1 is a schematic diagram of a communications system with several network nodes according to the invention and several gateway nodes according to the invention.

FIG. 1 shows a communications system KS, a terminal TE, and a subscriber A associated with this terminal. The communications system KS comprises several communications networks KN1 to KN4, which are connected with one another and are assigned to different network operators OP1, OP2, OP3, and OP4, respectively.

Each of the communications networks KN1 to KN4 represents an ISDN (integrated services digital network) of a network operator. The communications networks KN1 to KN4 may also be formed by other communications networks of different network operators that support voice, image, and/or data. They can thus be conventional analoge telephone networks, broadband ISDNs, mobile radio networks, for example networks based on the GSM standard (GSM=Global System for Mobile Communications), data networks, for example networks based on the TCP/IP protocol (TCP/IP=Transmission Control Protocol/Internet Protocol), or communications networks in which a subscriber can be reached via different types of terminals (wireline terminal, mobile terminal, cordless terminal), as is the case in a PCS (Personal Communications System), for example. The communications networks KN1 to KN4 may also comprise different kinds of networks. A telephone connection may extend via a mobile radio network, an ISDN network, and a PCS network, for example. If suitable gateway functions are provided, such a telephone connection may also extend through a data network (e.g., Internet). A data connection may extend through different data and telephone networks, too.

The terminal TE is an ISDN telephone. It may also be an analog telephone, a video telephone, a computer, or a mobile telephone.

From a logical point of view, each of the communications networks KN1 to KN4 consists of one or more network nodes, of which only the network nodes involved in one connection (connection configuration), i.e., network nodes AN, N1 to N12, and GN1 to GN6, are shown in FIG. 1.

The network node AN is an access node of the network operator OP1, of whom the subscriber A is a customer. This network node enables the subscriber A to establish a connection and obtain access to the connection configuration so established. The network node AN is formed by an ISDN local exchange to which the terminal TE is connected via a subscriber line.

The network nodes GN1 to GN6 are gateway nodes which interconnect different communications networks. Pairs of network nodes GN1 and GN2, GN3 and GN4, as well as GN5 and GN6 of adjacent communications networks are interconnected via information-carrying and signaling channels, and form gateways GATE1, GATE2, and GATE3, respectively. The network nodes GN1 to GN6 are transit exchanges which provide network interworking functions (protocol adaptation, ISUP screening, charging, etc.). A gateway node may also be formed by an Internet gateway computer which additionally provides bridging, routing, and network-access functions.

The network nodes N1 to N12 are service nodes which provide services for the connection. Such a service may be a connection service or a telecommunications service.

A connection service consists, for example, in the provision of a connection to the subsequent network node. A network node which provides such a service is, for example, an exchange or a switching or protocol conversion element of a data network.

A telecommunciations service consists, for example, of the provision of information, such as weather reports or stock exchange data, of a superordinate connection service which goes beyond the connection setup proper and determines, for example, a subsequent destination, e.g., PVN service (PVN=Private Virtual Network), global number service, least-cost routing service, or of an order service, such as telebanking, booking service (flight, rent-a-car, . . . ) or teleshopping (Fleurop).

A network node which provides a telecommunications service is formed by a service platform and a service program running thereon. The service platform is implemented with an IN system (IN=Intelligent Network), which consists of several service switching points and one or more service control points communicating with the service switching points. The communication is carried out via the No. 7 Signaling System using the INAP protocol (INAP=Intelligent Network Application Part) or the CAP protocol (CAP=Camel Application Part, IN for mobile radio networks). It is also possible that an exchange forms a service platform for service control programs (e.g., ISDN services), or that a server computer (e.g., Internet server) forms a service platform.

Subscriber A initiates the establishment of a connection by sending via the terminal TE to the access node AN a request to set up a connection to a destination address. Such a destination address is, for example, the number of a destination subscriber or of a service provided by one of the communications networks KN1 to KN4. During the establishment and existence of the connection, the subscriber makes use of connection services and telecommunications services in the telecommunications networks KN1 to KN4, for which charges have to be paid by subscriber A.

In the communications network KN1, for example, subscriber A uses connection services of the network node N1 and a telecommunications service of the network node N2 which consists in the extension of the call to the network node N3 of the communications network KN2. In the communications networks KN2 and KN3, similar services are provided for the connection by the network nodes N3 to N8. In the communications network KN4, the network node N12 forms the terminating point of the connection. The network node N12 makes available to subscriber A a telecommunications service in the form of an order service, for example.

From a logical point of view, three different parties are involved in the connection configuration, namely a requesting subscriber, a network operator, and a service provider:

The subscriber A, as a customer, makes use of connection services and telecommunications services.

The network operator OP1, as the access-network operator of subscriber A, is responsible for the collection and distribution of all charges payable for the connection configuration. The network operator OP1 is also responsible for the charge accounting procedure with the network operators adjacent to its own communications network KN1, including the network operator OP2. The network operator OP2, in turn, is responsible for the charge accounting procedure with the network operator OP3, and the latter is responsible for the charge accounting procedure with the network operator OP4. Furthermore, the respective network operators OP1 to OP4 pass their shares in the total charge paid for the connection by subscriber A on to the service provider. It is also possible for a service provider to bill subscriber A directly (direct contractual relationship between service provider and subscriber A). The access-network operator OP1 is not responsible for the collection and distribution of such charges.

The service providers offer no connection services, but only telecommunications services. Therefore, they could also be referred to as "service operators". A network operator makes available to them a service platform which then runs the service provider's service control program to provide a telecommunications service in the communications network of the network operator. If the service provider does not have a direct contract with subscriber A, he will balance accounts with the network operator who made the service platform available to him.

For charging and for the indication of the service charges accrued for the connection configuration, the following types of charge signaling are used:

Effective-charge signaling. By the effective charge signaling, the transfer of charge claims within the connection configuration is controlled. The effective-charge data put out by an arbitrary network node corresponds to a claim to a given compensation. The effective-charge data received by an arbitrary network node corresponds to an assumption of the charge claims of one or more other nodes. A receiving network node is responsible for the payment of the charges transferred by the received effective-charge signaling.

Dummy-charge signaling. If charges accrue from the use of services for which the service provider bills subscriber A directly, no effective-charge data is signaled to another network node, since the claim has already been settled. The settlement with the service provider may be effected by transfer of a credit-card number or by the use of a password previously agreed with the service provider. In addition, the network node of a service provider can assume effective charges and bill the latter directly to the subscriber (e.g., credit-card service which pays the charge for the connection configuration or for a part of the connection configuration).

To be able to take these directly charged amounts into account in the indication of the accumulated or accumulating charges for the connection at the subscriber, these amounts are signaled toward the subscriber by dummy-charge signaling. To be able to give discounts, the signaled dummy charges may be less than the assumed effective charges.

The individual network nodes AN, N1 to N12, and GN1 to GN6 can now transfer effective-charge data (claim to charges) or receive effective-charge data (assumption of charges). The basic rule is that the amount of effective charges assumed must be equal to the amount of effective charges transferred. It is also possible for effective-charge data to be received only by access nodes and gateway nodes.

All effective charges assumed by the access node AN must be paid by subscriber A to the network operator OP1. All effective charges assumed by a service node, plus the charges for the provision of the service platform, are paid by the respective service provider to his network operator. Conversely, the service provider of a service node receives from his network operator all effective charges transferred by the service node less the charges for the provision of the service platform. All effective charges assumed/transferred by a gateway in one communications networks on one side are paid/received by the other side, i.e., by the network operator of the other communications network.

The structure of a service node will now be explained by the example of the network node N3 with reference to FIG. 2a.

Figure 2A:
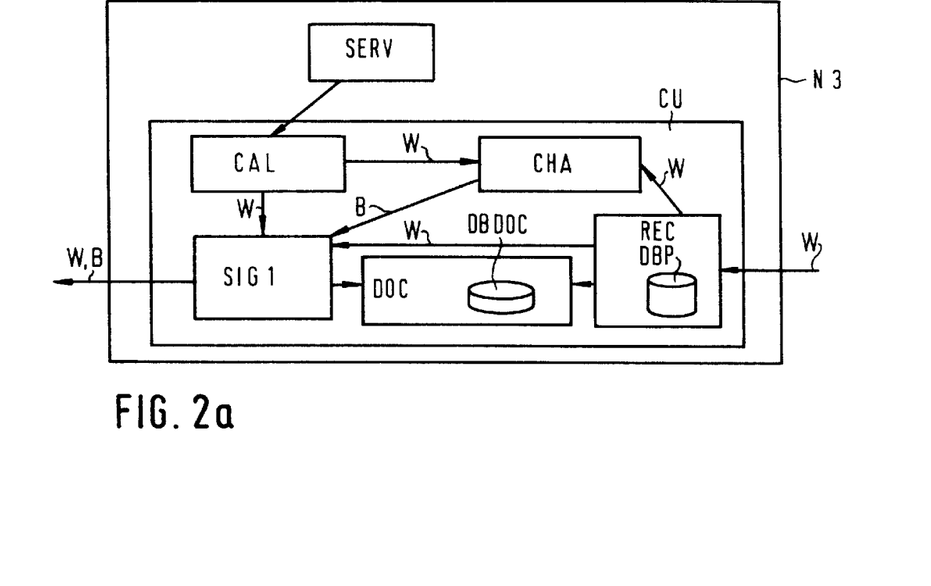
FIG. 2a is a block diagram of a network node of the communications system of FIG. 1.

FIG. 2a shows the network node N3, which comprises a server SERV and a charging unit CU. The charging unit CU contains five control units SIG1, CAL, DOC, CHA, and REC. The control units SIG1, CAL, CHA, and REC receive and send effective charges W and dummy charges B.

The server SERV makes available the service provided by the network node N3. The network node N3 may also provide two or more different services, in which case it has two or more servers.

The control unit CAL determines the charge for the provision of a service by the server SERV (or by the servers of the network node N3). To that end, a one-time tariff fixed for the service provision or a tariff rate is computed and the charge to be assigned is determined therefrom. The charge determined represents an effective charge W and is passed from the control unit CAL to the control unit SIG1 or to the control unit CHA.

The control unit SIG1 assumes effective charges W from the control units CAL and REC, and dummy charges B from the control unit CHA. To charge for services provided for the connection in the communications network KN1, the control unit SIG transfers effective charges W assumed by it to the gateway node GN2, which represents the gateway node assigned to the connection toward the access communications network KN1. The control unit SIG1 also transfers the dummy charges B assumed by it to this gateway node. It is also possible for the control unit SIG to transfer effective charges to another service node of the communications network KN2.

The control unit REC assumes effective charges from other network nodes of the communications network KN2 and passes it on to the control unit SIG1 or CHA.

It is advantageous that for each network node, a charge reception profile is established which indicates to what extent the network node assumes the effective charges transferred by other network nodes of the same communications network. For example, it may assume effective charges only for the subsequent network nodes or only for the preceding link. This charge reception profile is stored in the respective associated network node. In the network node N3, this charge reception profile is stored in a database DBP, which is managed by the control unit REC. The control unit REC provides a filter function which accesses the database DBP and decides on the basis of the profile stored therein whether to accept or refuse an effective charge. It is also possible to transfer this profile to the other network nodes of the respective communications network and thus influence their output behavior. In that case, these profiles would be managed by the control unit SIG1.

The assumption or transfer of dummy charges can be filtered in the same manner.

The control unit CHA provides a function which permits a direct settlement of accounts between the subscriber A and a third party (credit-card institution, service operator). The control unit CHA assumes from the control units CAL and REC effective charges W, which it bills to that third party, and, as explained above, outputs a corresponding dummy charge B to the control unit SIG1.

It is advantageous to document the assumption and transfer of effective charges in each of the network nodes AN, N1 to N12, and GN1 to GN6, so that it can be reconstructed and proved. This function is provided by the control unit DOC. The latter contains a database DBDOC which holds information as to whether and, if so, to which network node the network node N3 has transferred effective charges and from which network nodes it has assumed effective charges.

The database may be structured as follows. For each network node of the associated communications network KN2, one storage location is provided. In this location, the effective-charge data received by this network node are entered along with information identifying the network node to which these effective-charge data were transferred.

If the network node N3 provides a service and transfers effective-charge data for this service, it will additionally store information as to why it transferred these effective-charge data. For example, it will store information that it signaled effective charges for the use of a service XY.

It is advantageous to document the assumption and transfer of dummy charges in the same manner.

The control units CHA, DOC, and REC can also be dispensed with in carrying out the method according to the invention; they only represent further developments of the invention.

The structure of a gateway will now be explained by the example of the gateway GATE1 with reference to FIG. 2b.

Figure 2B:
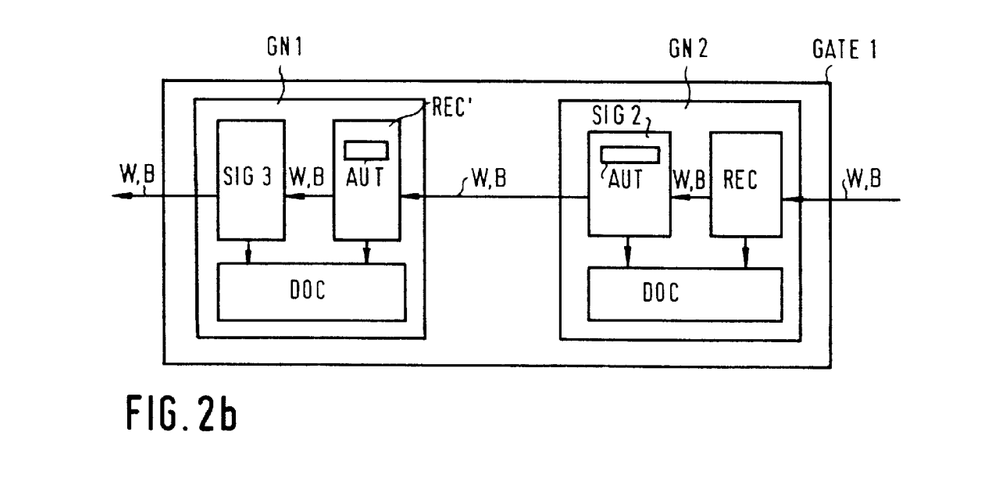
FIG. 2b is a block diagram of two gateway nodes of the communications system of FIG. 1.

FIG. 2b shows the gateway GATE1 with the gateway nodes GN1 and GN2, which contain control units SIG3, DOC, REC' and SIG2, DOC, REC, respectively. The control units SIG3, REC, SIG2, and REC' receive and send effective charges W and dummy charges B.

In the gateway GATE1, the effective charges assumed by one side of the gateway must be equal to the effective charges transferred on the other side.

The control unit REC contains the same functional groups as the control unit REC of FIG. 2a. It receives from network nodes of the communications network KN2 those effective charges W and dummy charges B which relate to the provision of services for the connection.

The control unit SIG2 assumes the effective charge W and dummy charge B signaled by network nodes of the communications network KN2 to the control unit REC, and signals these charges onward to the access network of the call originator A for billing in this communications network. To this end, the control unit SIG2 signals the assumed effective charges W and dummy charges B to a gateway node of a connectionwise preceding communications network. The two gateway nodes form a gateway to the access network. By the transfer from the control unit SIG2, the claim to the effective charges is transferred by the network operator OP2, and the latter gets paid by the network operator OP1.

The control unit REC' contains the same functional groups as the control unit REC of FIG. 2a. It assumes effective charges W and dummy charges B from one or more gateway nodes of a connectionwise following communications network, these one or more gateway nodes and the gateway node with the control unit REC' providing a gateway to the access network of the call originator A. With the assumption of the effective charges by the control unit REC', the claim to the effective charges is taken over and admitted by the network operator OP1.

Each of the control units SIG2 and REC' includes, in addition to the functional groups described above, a functional unit AUT which permits the following further function:

In the gateway GATE1, during the establishment of the connection, an understanding is reached on the mutual assumption of effective charges, which is controlled by the functional units AUT. This understanding corresponds to the conclusion of a contract between the respective network operators OP1 and OP2 on the assumption of the charges payable for services used for the connection configuration in the connectionwise following communications network KN2 and in the next following communications networks KN3 and KN4. For this understanding, the signaled effective charges are mutually acknowledged by a coded message whose formation can be reconstructed only by the communications network transmitting the coded message.

The control unit SIG3 assumes the effective charges W and dummy charges B signaled by network nodes of the communications network KN2 to the control unit REC, and signals these charges onward to the access network of the call originator A. To accomplish this, the control unit SIG3 signals the assumed effective charges W to the access node AN of subscriber A if the communications network which the gateway node GN1 belongs to is the access network of subscriber A and, thus, the communications network of the access node AN. If that is not the case, the control unit SIG3 will signal the assumed effective charges W to a connectionwise preceding gateway node of the communications network of the gateway node GN1. This preceding network node and a gateway node of a preceding communications network of the communications system provide a further gateway to the access network of subscriber A. The dummy charges B are signaled onward in the same manner.

It is also possible for effective charges and dummy charges to be signaled by the control unit SIG3 to different network nodes.

A first embodiment of the billing for the services used by the connection will now be explained with reference to FIG. 3.

Figure 3:
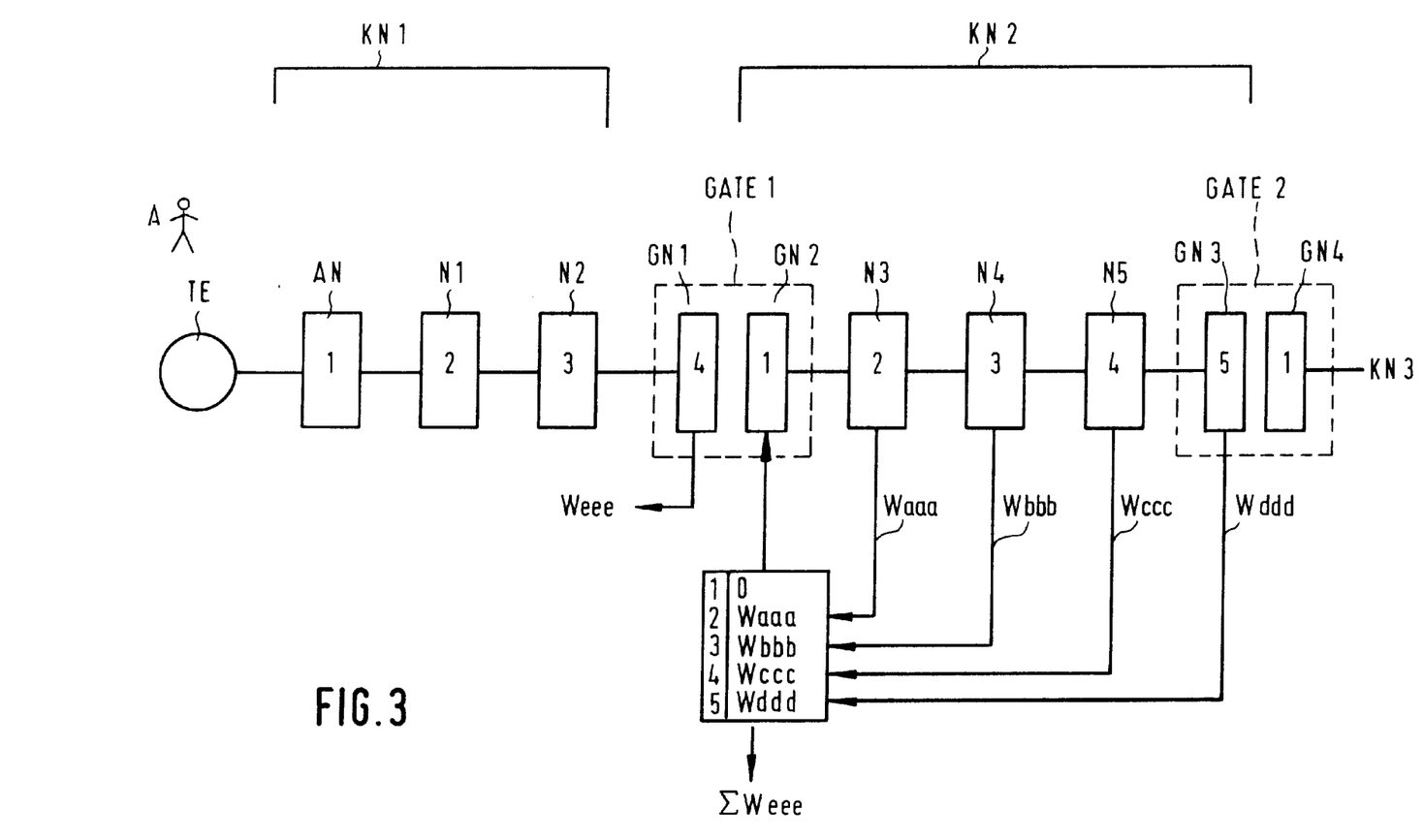
FIG. 3 is a functional diagram of a part of the communications system of FIG. 1 for a first embodiment.

FIG. 3 shows those network nodes of the communications networks KN1 and KN2 which form part of the connection configuration, namely the network nodes AN, N1 to N5, and GN1 to GN4, as well as the terminal TE associated with subscriber A. Within its communications network, each of the network nodes is assigned a unique identifier by which it identifies itself to the other nodes during charge signaling. Thus, the network nodes AN, N1, N2, and GN1 of the communications network KN1 are assigned identifiers 1, 2, 3, and 4, respectively. The network nodes GN2, N3, N4, N5, and GN3 of the communications network KN1 are assigned identifiers 1, 2, 3, 4, and 5, respectively. The connection is set up through the communications network KN1 and KN2 in the following order: from terminal TE to access node AN and then via network nodes N1, N2, GN1, GN2, N3, N4, N5, GN3 to network node GN4.

The network nodes N3, N4, and N5 of the communications network provide services for the connection and determine charges assigned to the respective services, Waaa, Wbbb, and Wccc, respectively. The determined charges Waaa, Wbbb, and Wccc are signaled through the communications network KN2 to the gateway node GN2, which represents the first network node of the connection configuration in the communications network KN1 in the forward direction. Furthermore, the gateway node GN3 signals a charge Wddd to the gateway node GN2. The charge Wddd represents the service charges accumulated for the connection in the communications networks KN3 and KN4. No charge Wddd is signaled if the connection configuration comprises only network nodes of the communications networks KN1 and KN2.

This signaling is effected via Signaling System No. 7. It may also be effected over a reverse channel established within the establishment of the connection configuration.

The gateway node GN2 assumes the effective charges signaled to it by the network nodes N3 to N5 and the gateway node GN3, i.e., the charges Waaa, Wbbb, Wccc, and Wddd. The transferred and assumed charges Waaa, Wbbb, Wccc, and Wddd, together with the identifier of the assuming or transferring network node, are stored in the network nodes N3, N4, N5, and GN3 and in the network node GN2. The charges signaled to the network node GN2, i.e., Waaa, Wbbb, Wccc, and Wddd, are added in this network node, and a corresponding aggregate charge Weee is signaled to the network node GN1, which then carries out the onward signaling to the access node AN.

A second embodiment of the billing for services used by the connection will now be explained with reference to FIG. 4.

Figure 4:
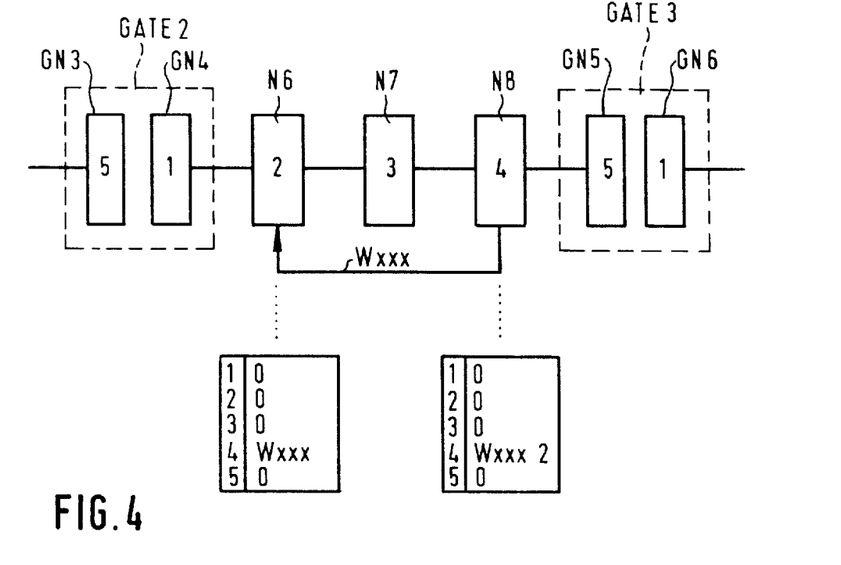
FIG. 4 is a functional diagram of a part of the communications system of FIG. 1 for a second embodiment.

FIG. 4 shows those network nodes of the communications network KN3 which form part of the connection configuration, namely the network nodes N6 to N8 and GN3 to GN6. The network nodes GN4, N6, N7, N8, and GN5 of the communications network KN3 are assigned unique identifiers within the communications network KN3, namely identifiers 1, 2, 3, 4, and 5, respectively.

The network node N6 assumes effective charges Wxxx from the network node N8. The network node N6 thus pays the charges claimed by the network node N8. In the network node N6, information is stored that the effective charge Wxxx was assumed from the network node with the identifier 4. In the network node N8, information is stored that the effective charge Wxxx, which was assumed from the network node with the identifier 4, i.e., which arose in the network node N8 itself, was transferred to the network node with the identifier 2. The effective charges signaled by the other network nodes of the communications network KN3 are not assumed by the network nodes N6 and N8; the corresponding storage locations are therefore filled with 0s.

A third embodiment of the billing for services used by the connection will now be explained with reference to FIG. 5.

Figure 5:
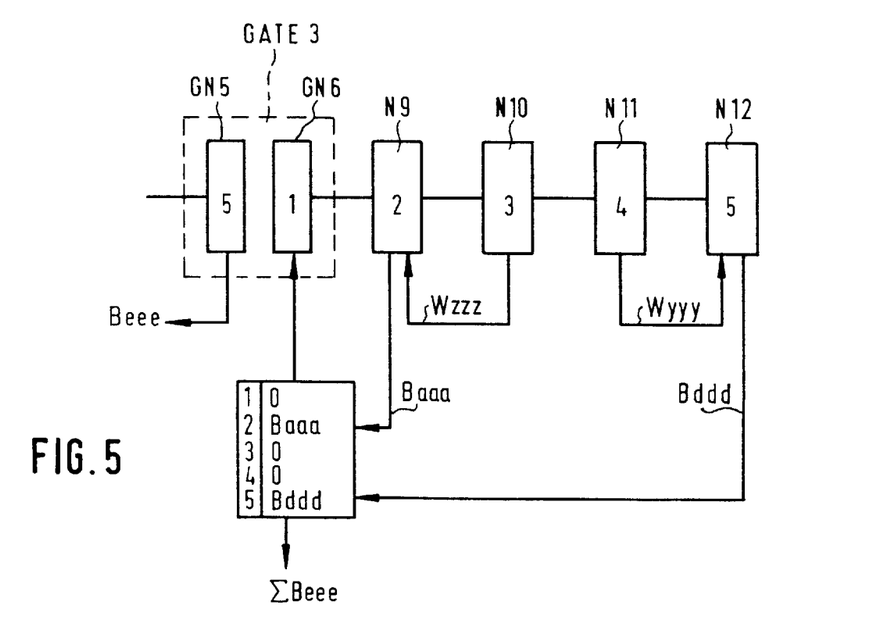
FIG. 5 is a functional diagram of a part of the communications system of FIG. 1 for a third embodiment.

FIG. 5 shows those network nodes of the communications network KN4 which form part of the connection configuration, namely the network nodes N9 to N12 and GN5 and GN6. The network nodes GN6, N9, N10, N11, and N12 of the communications network KN4 are assigned unique identifiers within the communications network KN4, namely identifiers 1, 2, 3, 4, and 5, respectively.

The network node N12 assumes an effective charge Wyyy from the network node N11. A dummy charge Bddd is stipulated by the service provider of the network node N12 and is signaled by the network node N12 to the network node GN6. The network node N9 assumes an effective charge Wzzz from the network node N10. A dummy charge Baaa is stipulated by the service provider of the network node N9 and is signaled by the network node N9 to the network node GN6. All dummy charges assumed by the gateway node GN6 are added to form a dummy charge Beee, which is signaled to the associated gateway node GN5 of the preceding communications network KN3, which then signals the dummy charge Beee onward to subscriber A. The assumed and transferred dummy and effective charges are stored in the respective network nodes.

A fourth embodiment of the billing for services used by the connection configuration will now be explained with reference to FIG. 6.

Figure 6:
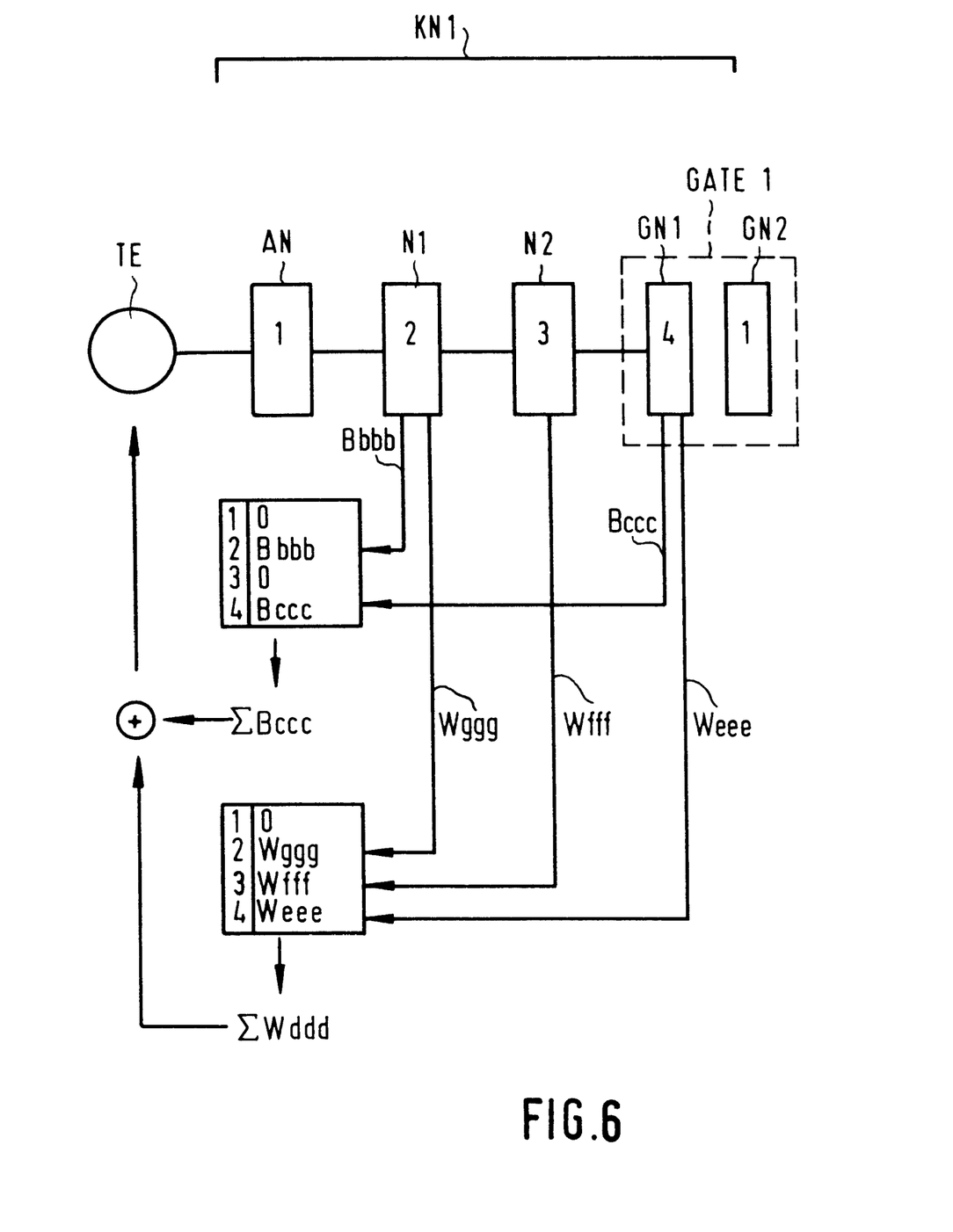
FIG. 6 is a functional diagram of a part of the communications system of FIG. 1 for a fourth embodiment.

FIG. 6 shows the network nodes of the communications network KN1 which form part of the connection configuration, namely the network nodes AN, N1, N2, GN1, GN2, and the terminal TE. The network nodes AN, N1, N2, and GN1 of the communications network KN1 are assigned unique identifiers within the communications network KN1, namely identifiers 1, 2, 3, and 4, respectively.

The access node AN assumes effective charges wggg, Wfff, and Weee from the network nodes N1, N2, and GN1. These effective charges are added to form an effective charge Wddd. The access node AN further assumes dummy charges Bbbb and Bccc from the network nodes N1 and GN1. These dummy charges are added to form a dummy charge Weee. The access node AN now adds all effective and dummy charges assumed by it and signals this sum to the terminal TE, where it is indicated to subscriber A. The indication can be either in the form of a total charge to be paid by the subscriber or as a currently payable rate.

This charge indication can also be dispensed with, of course.

The access node AN then controls the balancing of the received effective charges Wddd by sending a message to the billing center of the network operator OP1, which indicates a corresponding charge claim of the network operator OP1 against subscriber A. The transmission of this information to the billing center may also take place during postprocessing, of course. It is also possible to send the effective charges Wggg, Wfff, and Weee in the communications network KN1 directly to the billing center of the network operator Op1.

Furthermore, the gateway nodes GN1 to GN6 may additionally signal the assumption and transfer of effective charges on-line to the billing centers of their network operators OP1, OP2, OP3, and OP4, respectively. In this manner, the balancing of accounts between the network operators OP1, OP2, OP3, and OP4 can be further accelerated.

What is claimed is:

1. A method of charging for services in a communications system (IS) consisting of two or more communications networks (KN1 to KN4) of different network operators (OP1 to OP4), wherein for a connection whose establishment was initiated by a subscriber (A) of a first communications network (KN1) of the communications system, one or more services are provided by network nodes (N3 to N5; N6 to N8; N9 to N12) of a second communications network (KN2; KN3; KN4) of the communications system (KS), characterized in that each of t he network nodes (N3 to N5; N6 to N8; N9 to N12) of the second communications network (KN2; KN3; KN4) which provide services for the connection determines a charge (Waaa to Wzzz, Baaa to Beee) assigned to the service provided, in that charges (Waaa to Wccc) are signaled from network nodes of the second communications network to a first gateway node (GN2) of the second communications network which is assigned to the connection in the direction of the first communications network (KN1) and which signals (Weee) the charges signaled to it onward to the first communications network (KN1), in that each network node (N3) is chosen to comprise a first control unit (CAL) which is so designed that, if the network node provides a service for a connection whose establishment was initiated by the subscriber (A) of the first communications network (KN1) of the communications system (KS), it determines the charge (W) assigned to the service provided, and in that the network node (N3) further is chosen to comprise a second control unit (SIG1) which is designed to signal charges (W) to the first gateway node (GN2) of the second communications network (KN2) which is assigned to the connection in the direction of the first communication network (KN1) and which signals (Weee) the charges signaled to it onward to the first communications network (KN1).

2. A method as claimed in claim 1, characterized in that a second gateway node (GN3) of the second communications network (KN2), which is assigned to the connection in the direction of an adjacent, third communications network (KN3) of the communications system (KS), signals charges (Wddd) to the first gateway node (GN2) which have accumulated for the connection in the third communications network (KN3) and/or for services provided in at least one subsequent, further communications network (KN4) of the communications system (KS), and that the first gateway node (GN2) signals (Weee) said charges accumulated in the third communications network (KN3) and/or in the at least one further communications network (KN4) toward the first communications network (KN1).

3. A method as claimed in claim 1, characterized in that for carrying out the onward signaling, the first gateway node (GN2) signals the assumed charges (Weee) to a third gateway node (GN1) of the connectionwise preceding communications network (KN1), with the first and third gateway nodes together providing a gateway (GATE1) to the first communications network (KN1), and that the third gateway node (GN1) signals said charge to the access node (AN) if the preceding communications network (KN1) is the first communications network (KN1), and otherwise signals said charge to a connectionwise preceding fourth gateway node.

4. A method as claimed in claim 1, characterized in that between the first gateway node (GN2) and the third gateway node (GN1), authorization signaling is carried out, by means of which an assumption by the network operator of the preceding communications network of the charges signaled by the first gateway node is agreed.

5. A method as claimed in claim 1, characterized in that the first gateway node (GN2) sums the charges (Waaa to Wddd) signaled to it, and signals them as an aggregate charge (Weee) onward to the first communications network (KN1).

6. A method as claimed in claim 1, characterized in that charges not yet made are signaled as effective charges (Waaa to Wzzz), and that charges already made are signaled as dummy charges (Baaa to Beee).

7. A method as claimed in claim 1, characterized in that network nodes are assigned charge profiles, and that according to the respective charge profile, charge signaling is accepted or refused by a network node.

8. A method as claimed in claim 1, characterized in that the charges (Waaa to Wzzz, Baaa to Beee) signaled to a network node (AN, N1 to N12, GN1 to GN6) are stored in the latter for reference purposes.

9. A method as claimed in claim 1, characterized in that the charges (Waaa to Wzzz, Baaa to Beee) signaled into the first communications network (KN1) are passed to the access node (AN) of the subscriber (A).

10. A method as claimed in claim 9, characterized in that the access node (AN) indicates the charges (Waaa to Wzzz, Baaa to Beee) signaled to it to the subscriber (A).

11. A method as claimed in claim 1, characterized in that the charges signaled into the first communications network are passed directly to a billing center of the first network operator.

12. A network node (N3) for connection to a second communications network (KN2) in a communications system (KS) consisting of two or more communications networks (KN1 to KN4) of different network operators (OP1 to OP4) characterized in that the network node (N3) comprises a first control unit (CAL) which is so designed that, if the network node provides a service for a connection whose establishment was initiated by a subscriber (A) of a first communications network (KN1) of the communications system (KS), it determines a charge (W) assigned to the service provided, and that the network node (N3) further comprises a second control unit (SIG1) which is designed to signal charges (W) to a gateway node (GN2) of the second communications network (KN2) which is assigned to the connection in the direction of the first communications network (KN1) and which signals (Weee) the charges signaled to it onward to the first communications network (KN1).

13. A gateway node (GN2) for connection to a second communications network (KN2) in a communications system (KS) consisting of two or more communications networks (KN1 to KN4) of different network operators (OP1 to OP4), characterized in that the gateway node (GN2) comprises a first control unit (REC) which is designed to receive from network nodes (N3, N4, N5, GN3) of the second communications network (KN2) charge data (Waaa to Wddd) relating to the provision of services for a connection whose establishment was initiated by a subscriber (A) of a first communications network (KN1) of the communications system (KS), and that the gateway node (GN2) further comprises a second control unit (SIG2) which is designed to signal (Weee) the charge data (Waaa to Wddd) received from the gateway nodes onward to the first communications network (KN1).

14. A gateway node (GN1) for connection to a second communications network (KN1) in a communications system (KS) consisting of two or more communications networks (KN1 to KN4) of different network operators (OP1 to OP4), characterized in that the gateway node (GN1) comprises a first control unit (REC') which is designed to receive charge data (Weee) relating to the provision of services for a connection initiated by a subscriber (A) of the first communications network (KN1) from a gateway node (KN2) of a subsequent, third communications network (KN2), the two gateway nodes (GN1, GN2) providing a gateway (GATE1) to a first communications network (KN1) of the communications system (KS), and that the gateway node (GN1) further comprises a second control unit (SIG3) which is designed to signal the received charge data (Weee) to an access node (AN) of the subscriber (A) if the second communications network (KN1) is the first communications network (KN1), and otherwise to signal the received charge data to a connectionwise preceding gateway node of the second communications network which, together with a gateway node of a fourth communications network of the communications system, provides a gateway to the first communications network.

* * * * *